US012581354B2

(12) United States Patent
Römer et al.

(10) Patent No.: US 12,581,354 B2
(45) Date of Patent: Mar. 17, 2026

(54) DYNAMIC QoS MAPPING IN A HOME NETWORK

(71) Applicant: Deutsche Telekom AG, Bonn (DE)

(72) Inventors: Stefanus Römer, Hennef (DE); Manuel Paul, Berlin (DE); Ahmed Hafez, Düsseldorf (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 18/864,913

(22) PCT Filed: May 12, 2023

(86) PCT No.: PCT/EP2023/062769
§ 371 (c)(1),
(2) Date: Nov. 12, 2024

(87) PCT Pub. No.: WO2023/218037
PCT Pub. Date: Nov. 16, 2023

(65) Prior Publication Data
US 2025/0330865 A1     Oct. 23, 2025

(30) Foreign Application Priority Data

May 13, 2022     (EP) ..................................... 22173150

(51) Int. Cl.
H04W 28/02          (2009.01)
H04L 41/5009        (2022.01)
H04W 88/16          (2009.01)
(52) U.S. Cl.
CPC ..... *H04W 28/0268* (2013.01); *H04L 41/5009* (2013.01); *H04W 88/16* (2013.01)
(58) Field of Classification Search
CPC .............. H04W 28/0268; H04W 88/16; H04L 41/5009
See application file for complete search history.

(56) References Cited

U.S. PATENT DOCUMENTS

2020/0245192 A1*  7/2020  Roy .................... H04W 28/082
2021/0345161 A1*  11/2021  Zhu ....................... H04W 88/06

FOREIGN PATENT DOCUMENTS

CN          114302426 A     4/2022
WO    WO 2018224122 A1    12/2018

OTHER PUBLICATIONS

"3rd Generation Partnership Project; Technical Specification Group Services and System Aspects; Study on the support for 5WWC, Phase 2 (Release 18)", No. {0} V0.2.0, Apr. 16, 2022 (Apr. 16, 2022), p. 1-69, 3GPP Standard; Technical Report; 3GPP TR 23.700-17, 3rd Generation Partnership Project (3GPP), Mobile Competence Centre; 650, Route Des Lucioles; F-06921 Sophia-Antipolis Cedex; France, Retrieved from the Internet: URL:https://ftp.3gpp.org/Specs/archive/23_series/23.700-17/23700-17-020.zip23700-17-020_MCClean.docx, XP052145981 [retrieved Apr. 16, 2022].

* cited by examiner

*Primary Examiner* — Ayanah S George
(74) *Attorney, Agent, or Firm* — Leydig, Voit & Mayer, Ltd.

(57) ABSTRACT

A method for selecting and applying a dedicated quality of service (QoS) class for a user equipment (UE) within a home network that communicates with a data network includes: communicating, by the UE, with the data network over a communication path, wherein the communication path comprises a first communication link of a first QoS class between the UE and a residential gateway (RG) and a second communication link of a second QoS class between the RG and the data network; and initially selecting, by the RG, a default QoS class for the first QoS class for the UE. The communication comprises an identification of the UE and/or a traffic descriptor that is received by the RG and/or by a network entity within the data network.

13 Claims, 5 Drawing Sheets

DYNAMIC QoS MAPPING IN A HOME NETWORK

CROSS-REFERENCE TO PRIOR APPLICATIONS

This application is a U.S. National Phase application under 35 U.S.C. § 371 of International Application No. PCT/EP2023/062769, filed on May 12, 2023, and claims benefit to European Patent Application No. EP 22173150.8, filed on May 13, 2022. The International Application was published in English on Nov. 16, 2023 as WO 2023/218037 A1 under PCT Article 21 (2).

FIELD

The invention relates to techniques for providing dynamic quality-of-service (QoS) mapping in a home network. In particular, the invention relates to a method, a user equipment, a residential gateway, a communication system, and a computer program product for providing dynamic QoS mapping in a home network.

The invention is within the context of fixed mobile convergence (FMC). FMC means that a 5G core network controls the usage of fixed access lines, such as digital subscriber line (DSL) or optical fiber, in such a way that user authentication, session management and user data transfer is done by the 5G core network according to 3GPP standards. This is especially advantageous in hybrid access scenarios in which a user equipment connects to 5G network by using a mobile data path and a fixed line data path. A so-called 5G residential gateway (5G-RG) is needed at the edge of the home network in order to interact with the 5G core of the data network and to provide data connectivity to user equipment within the home network. These user equipment is typically connected to the 5G-RG via Wi-Fi or local area network (LAN).

BACKGROUND

Today's 5G-RG devices only provide a default QoS class to a user equipment so that is currently not possible to tailor the packet data unit (PDU) sessions to the actual demands of an application running on the user equipment and/or to the user equipment itself.

SUMMARY

In an exemplary embodiment, the present invention provides a method for selecting and applying a dedicated quality of service (QoS) class for a user equipment (UE) within a home network that communicates with a data network. The method includes: communicating, by the UE, with the data network over a communication path, wherein the communication path comprises a first communication link of a first QoS class between the UE and a residential gateway (RG) and a second communication link of a second QoS class between the RG and the data network; and initially selecting, by the RG, a default QoS class for the first QoS class for the UE. The communication comprises an identification of the UE and/or a traffic descriptor that is received by the RG and/or by a network entity within the data network. The RG and/or the network entity selects a dedicated QoS class based on: a user input and on the received identification, or the received identification and the received traffic descriptor. The RG applies the dedicated QoS class as the first QoS class.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
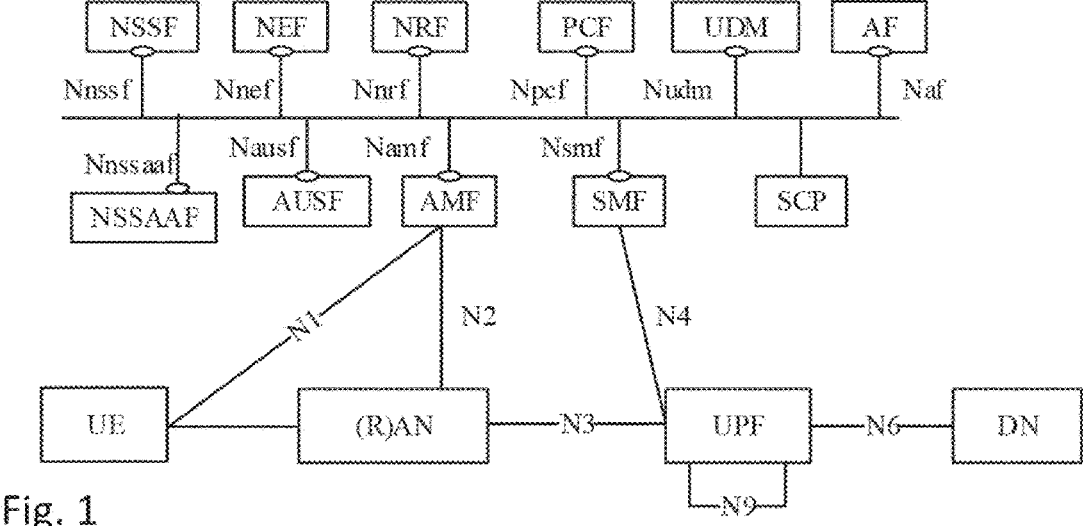
FIG. 1 shows a generic 5G core network.

Therefore, embodiments of the invention provide techniques to overcome the usage of only a default QoS class within a home network when communicating with a 5G core network.

The features of the various aspects of the invention described below or the various examples of implementation may be combined with each other, unless this is explicitly excluded or is technically impossible.

According to a first aspect of the invention, the invention provides a method for selecting and applying a dedicated QoS class for a user equipment within a home network, wherein the user equipment communicates with a data network via the home network. The data network is in particular a 5G core network.

The user equipment (UE) communicates with the data network over a communication path, wherein the communication path comprises a first communication link of a first QoS class between the UE and a residential gateway "RG", in particular a 5G-RG or a fixed network residential gateway (FN-RG), and a second communication link of a second QoS class between the RG and the data network.

it is also possible to refer to the communication links as pipes. Hence, the UE can send data packets via the first communication link to the RG that is a kind of interface for the home network to the 5G core network and forwards the data traffic to devices within the 5G core network. Of course, an analog procedure is performed when the UE receives data packets from the 5G core network;

in particular, the UE is non-3GPP device that does not support a 3GPP functionality;

The RG initially selects a default QoS class for the first QoS class for the UE;

in particular, the RG initially selects and applies default QoS class for the first QoS class for the first communication link; this basically means that data transfer over the first communication link is performed with a certain, namely a default, quality of service and corresponding resources are reserved for this communication;

Quality of service (QoS) is the description or measurement of the overall performance of a service, such as a telephony or computer network or a cloud computing service, particularly the performance seen by the users of the network. To quantitatively measure quality of service, several related aspects of the network service are often considered, such as packet loss, bit rate, throughput, transmission delay, availability, jitter, etc. Quality of service is the ability to provide different priorities to different applications, users, or data flows, or to guarantee a certain level of performance to a data flow. Quality of service is particularly important for the transport of traffic with special requirements. In particular, developers have introduced Voice over IP technology to allow computer networks to become as useful as telephone networks for audio conversations, as well as supporting new applications with even stricter network performance requirements; in the context of this disclosure, a higher QoS class refers to a QoS class that has in general a better overall performance than a lower QoS class;

selecting the default QoS class enables at least a basic communication to be provided. Hence, it is possible to transfer the traffic descriptors as explained below. Currently, only one QoS class is being established on the first and the second communication link that is not tailored to the needs of the UE, a running application or the network provider;

The communication comprises an identification of the UE and/or a traffic descriptor that is received by the RG and/or by a network entity within the data network;

this means that the communication comprises at least an identification of the UE but that the traffic descriptor is in principle optional;

the identification of the UE can be a medium access control (MAC) address, a user profile that has been associated to the UE, like an embedded subscriber identity module (eSIM), or other data that is suitable to provide the identification of the UE; the traffic descriptor is an information piece that is designed so that from this information piece certain technical and/or service requirements regarding the communication can be deduced; for example, an uplink and/or downlink bandwidth required by a running application; the traffic descriptor can be created by the UE, by an application running on the UE and/or indirectly by an online service;

the identification and/or the traffic descriptor can be put into data fields designed for that purpose or can be realized within common communication IP-protocols, for example transmission control protocol (TCP), datagram congestion control protocol (DCCP), and/or quick UDP Internet Connections (QUIC);

it is possible that the RG and/or the network entity receives the identification and/or the traffic descriptor for further evaluation and actions. Typically, the identification and/or the traffic descriptor will at least be forwarded by the RG to the network entity. The network entity can be a server within the 5G core network.

The RG and/or the network entity selects a dedicated QoS class based on a user input and on the received identification, or the RG and/or the network entity selects the dedicated QoS class automatically based on the received identification and the received traffic descriptor;

for this purpose, multiple QoS classes—or at least the various technical requirements for those multiple QoS classes—can be stored within the RG and/or within the network entity. In general, all these QoS classes will have different QoS properties regarding the communication. In this context, the QoS class amongst the multiple QoS classes that is tailored to the UE or to a respective running application on the UE is being described as the dedicated QoS class;

in the case of the user input, the communication requires the identification of the UE and the user input; whereas in the automatic selection, the communication requires the identification of the UE and the traffic descriptor; this can be expressed as that the traffic descriptor replaces the user input in the latter case;

in the case of the user input, the user can specify to which QoS classes the UE shall be assigned to; preferably, this will be realized as temporarily assignment because otherwise there would be the risk that all UEs will be stuck in the highest QoS class; the user input enables to assign the UE to a desired QoS class independent from any traffic descriptors; in the case a selection algorithm of the RG and/or the network entity performs the selection automatically the traffic descriptors are used to select the QoS classes that fits best to the traffic descriptor, this selected QoS class is the dedicated QoS class; the assignment can be entered and can be stored within the RG and/or the network entity, where an appropriate selection algorithm can be implemented;

The RG applies the dedicated QoS class as the first QoS class.

The applying of the dedicated QoS class basically means that the technical resources are reserved for running the communication with the dedicated QoS class.

This enables the advantage that dedicated QoS classes can be applied when the user equipment communicates with the data network via the home network. This enables the user, the user equipment and/or the network provider to dynamically control QoS mapping via the 5G core across available pipes (user/app→5G core (5GC) network exposure function (NEF)→UE route selection policy (URSP)→5G-RG). A further advantage is that the 5G core network can be used very efficiently as the QoS classes are tailored to the technical requirements of the UE. The solution enables to dynamically change or adapt the QoS of a given data connection within the home network and towards the external data network (DN) in a consistent way.

In particular, the method provides a mapping of the traffic descriptor, in particular of internal traffic descriptors, to external 5G PDU sessions with the dedicated QoS class.

In particular, the UE triggers or steers the usage of the dedicated QoS class as the first QoS class by providing identification and/or the received traffic descriptor. This is beneficial for user with respect to protection of data privacy because otherwise those identification and/or the received traffic data would be retrieved by a network entity so that theses information can get public.

In an embodiment, the dedicated QoS class is selected based on a static table that assigns the dedicated QoS classes to a corresponding traffic descriptor. This enables a selection from a unique assignment between multiple QoS classes with the corresponding traffic descriptor.

In an embodiment, the table is stored within a server of the data network or within the RG.

If the table is stored within a server of the data network, in particular within the network entity, this provides the advantage that the assignment between the multiple QoS classes and the traffic descriptors can be easily and efficiently updated by the network provider. Information from the network can be used to identify an application that is running on the UE and to identify the dedicated QoS class. The necessary information can be provided by so-called QoS flow identifier (QFI) parameters. On the other hand, storing the table within the RG provides the advantage that the dedicated QoS can be selected without using computational resources of the network provider as it is known in the context of the so-called edge computing principles.

In an embodiment, the traffic descriptor is designed in such a way that a minimum requirement for a QoS class can be determined from it.

This provides the advantage that the dedicated QoS class provides sufficient resources to run the communication of the user equipment with the data network.

In an embodiment, possible traffic descriptors are:

Physical port on the RG,

In computer networking, a port is a communication endpoint. At the software level, within an operating system, a port is a logical construct that identifies a specific process or a type of network service. A port is identified for each transport protocol and address combination by a 16-bit unsigned number, known as the port number. The most common transport protocols that use port numbers are the transmission control protocol (TCP) and the user datagram protocol (UDP). A port number is always associated with an IP address of a host and the type of transport protocol used for communication. It completes the destination or origination network address of a message.

Wi-Fi service set identifier (SSID), predefined Wi-Fi SSIDs over the same physical channel (default, . . . )→32 byte. In IEEE 802.11 wireless local area networking standards (including Wi-Fi), a service set is a group of wireless network devices which share a service set identifier (SSID)—typically the natural language label that users see as a network name. (For example, all of the devices that together form and use a Wi-Fi network called Foo are a service set.) A service set forms a logical network of nodes operating with shared link-layer networking parameters; they form one logical network segment;

MAC address of UE,

A media access control address (MAC address) is a unique identifier assigned to a network interface controller (NIC) for use as a network address in communications within a network segment. This use is common in most IEEE 802 networking technologies, including Ethernet, Wi-Fi, and Bluetooth. Within the Open Systems Interconnection (OSI) network model, MAC addresses are used in the medium access control protocol sublayer of the data link layer. As typically represented, MAC addresses are recognizable as six groups of two hexadecimal digits, separated by hyphens, colons, or without a separator.

QoS markings in a IP-header,

For example, differentiated services or DiffServ is a computer networking architecture that specifies a simple and scalable mechanism for classifying and managing network traffic and providing quality of service (QoS) on modern IP networks. DiffServ can, for example, be used to provide low-latency to critical network traffic such as voice or streaming media while providing simple best-effort service to non-critical services such as web traffic or file transfers. DiffServ uses a 6-bit differentiated services code point (DSCP) in the 8-bit differentiated services field (DS field) in the IP header for packet classification purposes. The DS field replaces the outdated IPV4 TOS field.

UE IP address, destination IP,

TCP Ports,

Type of application,

That is running on the UE or type of the online service within the data network with which the UE communicates;

Time of day,

Uplink and/or downlink information.

For example, the required uplink and/or downlink bandwidth needed by the application or the UE.

This provides the advantage that these traffic descriptors can be extracted from communication protocols that are already in use. Already one of the traffic descriptors, in particular the physical port on the 5G-RG, the Wi-Fi SSID or the MAC source, is in principal sufficient to select the dedicated QoS class for the communication. A combination of these traffic descriptors enables a further differentiation to find dedicated QoS classes that are tailored even better for the respective communication.

In an embodiment, the dedicated QoS class is selected based by a user assignment of the UE to the dedicated QoS.

As already mentioned above, this enables the user to assign a desired QoS class to his UE. For example, if the user is in a home office and awaits an important video conference call it might be desirable to assign the highest available QoS class to the user equipment. This is enabled by the user assignment even if the automatic selection process based on the traffic descriptors would not have selected the highest available QoS class to the user equipment. The user assignment can be done directly at the 5G-RG and/or via a companion app, in particular if the network entity performs the selection.

In an embodiment, the user assignment is automatically reset after a certain time or manually reset by the user.

This provides the advantage that the assignment is automatically cleared so that the UE does not stay within a desired QoS class to which it actually does not belong based on the traffic descriptors. It is possible to run applications with various demands regarding quality of service on a single user equipment. Without resetting the assignment, the user assignment would lead to the situation that the UE communicates with a QoS class that is not tailored to its actual needs. In reality, this might lead to the situation that all UEs will communicate with the highest QoS class.

In an embodiment, the UE measures levels of at least one key performance indicator (KPI) and changes to other traffic descriptors if the key performance indicator is outside a pre-defined key performance window.

In an embodiment, the UE changes to traffic descriptors that correspond to a better QoS class if the KPIs are worse than needed for running a current application or that the UE changes to traffic descriptors that correspond to a lesser QoS class if the KPIs are better than needed for running the current application.

The measurement can be performed periodically, wherein the frequency of the measurement can depend on the UE and/or on the application that is running on the UE. KPIs can be latency, packet loss, bandwidth and/or jitter values. For example, for a certain running application and/or a UE an acceptable key performance window for the latency can be predefined to be 20 ms to 40 ms. If the measurement yields a latency of 100 ms, then a better QoS class is needed in order to obtain latency value between 20 ms to 40 ms. In this case, an algorithm within the UE will choose a set or single traffic descriptor that corresponds to a better QoS class and to transmit this adjusted traffic descriptor with the communication. On the other hand, if the measured latency will you use a latency of 5 ms it might be possible to switch to a lesser QoS class because a lesser QoS class will in general consume fewer resources than the better QoS class. Instead of using predefined KPI windows it is also possible to use predefined KPI threshold values.

In an embodiment, the UE measures levels of at least one KPI, in particular regarding a running application, wherein a customized QoS class is created and applied as the first QoS class for the UE if the measured KPIs exceed predefined KPI threshold values. The customized QoS class can be created and applied on the first and/or on the second communication link. In that context, the customized QoS class can be described as being a special kind of dedicated QoS class. The different wording is mainly used to distinguish between the fact, that the QoS class can already exist or that they can be created on request.

Creating a customized QoS class provides the advantage that there is no need to create multiple QoS classes in advance and learn to choose one of these multiple QoS classes as the dedicated QoS class. Within the context of 5G and it is easily possible to create such QoS class on the fly which has the additional advantage that they can exactly be tailored to the needs of the UE and/or the running application. This also covers use cases that are a kind of unexpected so that currently no QoS class exists that is tailored to this use case.

In an embodiment, the first QoS class and the second QoS class are identical. For that purpose, it is possible that the data network adjusts its QoS class along the second communication link accordingly. It is possible that the data network does this automatically based on the received identification and the received traffic descriptor as described above are that the information about which quality of service shall be applied to the second QoS class is being shared between the UE, the RG and/or the data network. For example, a respective application can invoke an API to the 5G core network which can trigger appropriate changes of the QoS settings within the 5G core, the aggregation and the access. Depending on theses changings the 5G-RG can modify the corresponding settings with the internal home network for the respective application. This provides a way to dynamically change and mapping the QoS settings along the whole data path of the communication.

This provides the advantage that the UE and/or the running application can be provided with a uniform QoS class across the whole communication path between the user equipment and the data network, in particular with a service within the data network. Typically, if the first QoS class and the second QoS class do not match this leads to a performance degradation or to a waste of computational resources as follows: if the first QoS class is better than the second QoS class, then is likely to happen that the quality of service cannot be maintained if the data packets travel through the second QoS class. On the other hand, if first QoS class is worse than the second QoS class, then the quality of service for the data packets traveling through the second QoS class can be maintained but this would also be the case if the second QoS class would be identical to the first QoS class.

According to a second aspect, a user equipment is provided that is designed to send traffic descriptors when communicating with the data network, and/or the RG. The user equipment can be a computer, a smart phone, a tablet, a server or the like. Typically, the user component comprises a processing unit to run algorithms, in particular to run a selection algorithm that can select the dedicated QoS class or that can change the traffic descriptors as described above. In particular, the UE is configured to measures levels of KPIs and to change to other descriptors as described above. The UE comprises at least a communication interface that is configured to communicate over the first communication link.

According to a third aspect, a residential gateway is provided that is configured to perform the steps according to the method described above. The RG can be a 5G-RG or a FN-RG. The RG comprises a processing unit to run algorithms, in particular to run a selection algorithm that can select the dedicated QoS class or that can change the traffic descriptors as described above. In particular, the RG is configured to measures levels of KPIs and to change to other descriptors as described above. The RG comprises at least a communication interface that is configured to communicate over the first communication link and over the second communication link. The RG is configured to adapt the QoS class of the first communication link.

According to a fourth aspect, a communication system comprising a user equipment as described above, a residential gateway "RG" as described above, and a data network, wherein the UE communicates with the data network over a communication path, wherein the communication path comprises a first communication link of a first QoS class between the UE and the RG, in particular a 5G-RG or a FN-RG, and a second communication link of a second QoS class between the RG and the data network, wherein the communication system is configured to perform the steps according to the method described above.

A computer program comprising instructions which, when the program is executed by a network entity of a data network or a RG, cause the computer to carry out the method described above.

In the following detailed description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The 5G communication standard promises a significant improvement for its users in terms of stability, the provision of network frame conditions tailored to the customer, reduced latency, etc. In order to make the best possible use of the 5G communication standard, efforts are being made to operate both mobile communication and communication via wired lines together within the 5G standard.

Since the 5G communications standard has its origins in mobile communications and its core network is designed accordingly, the obvious effort is to adapt wireline communications with regard to the already existing mobile infrastructure. Hence, in the following some concepts of 5G communication will be described in the context of how it is currently done in the 5G cellular environment.

The approaches to "unify" the wired and the mobile world is often called fixed mobile convergence (FMC), where a 5G core network also controls the usage of fixed access lines such as DSL or optical fiber or cable in a way that user authentication, session management and the user data transfer is done by the 5G core network according to 3GPP standards.

In 5G, a "PDU Session" is used to provide end-to-end user plane connectivity between the UE and a specific data network (DN) through the user plane function (UPF). A PDU Session supports one or more QoS Flows. There is a one-to-one mapping between QoS Flow and QoS profile, i.e. all packets belonging to a specific QoS Flow have the same "5G Quality of Service Identifier" (5QI).

Existing standards for FMC are: BBF TR-456, BBF TR-470 and 3GPP TS 23.316.

A generic 5G core network is shown in FIG. 1.

Figure 2:
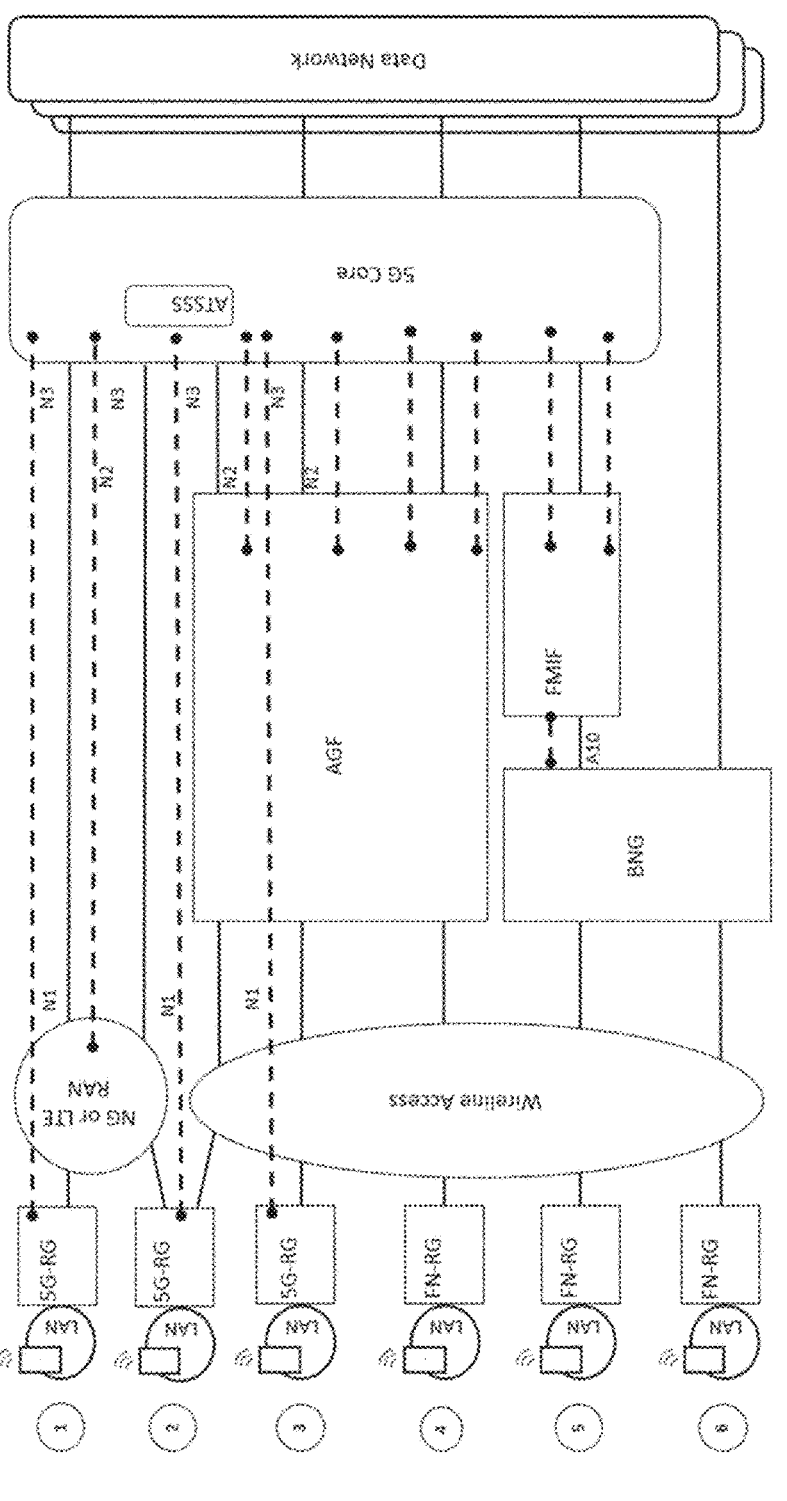
FIG. 2 shows an exemplary architectural framework of the communication system.

Typically, (in mobile networks) a UE (user equipment) is a smartphone and the (R)AN is a radio access network. In FMC, the UE is replaced by a 5G-RG or a FN-RG and the (R)AN by an access gateway function (AGF) as can be seen for example in FIG. 2 that shows an exemplary architectural framework of the communication system.

Differentiation between 5G-RG and FN-RG:

FN-RG: A common residential gateway without 5G functionality. The SIM based authentication is done completely by/within the AGF. On the downside, this method is very complex. To enable 5G functionality for legacy devices, AGF-modules are typically located at the interface between wired access and the 5G core network.

5G-RG: The 5G-RG contains a SIM and can authenticate itself directly towards the access and mobility management function (AMF) and "speaks" the 5G protocols and mechanisms.

Figure 3:
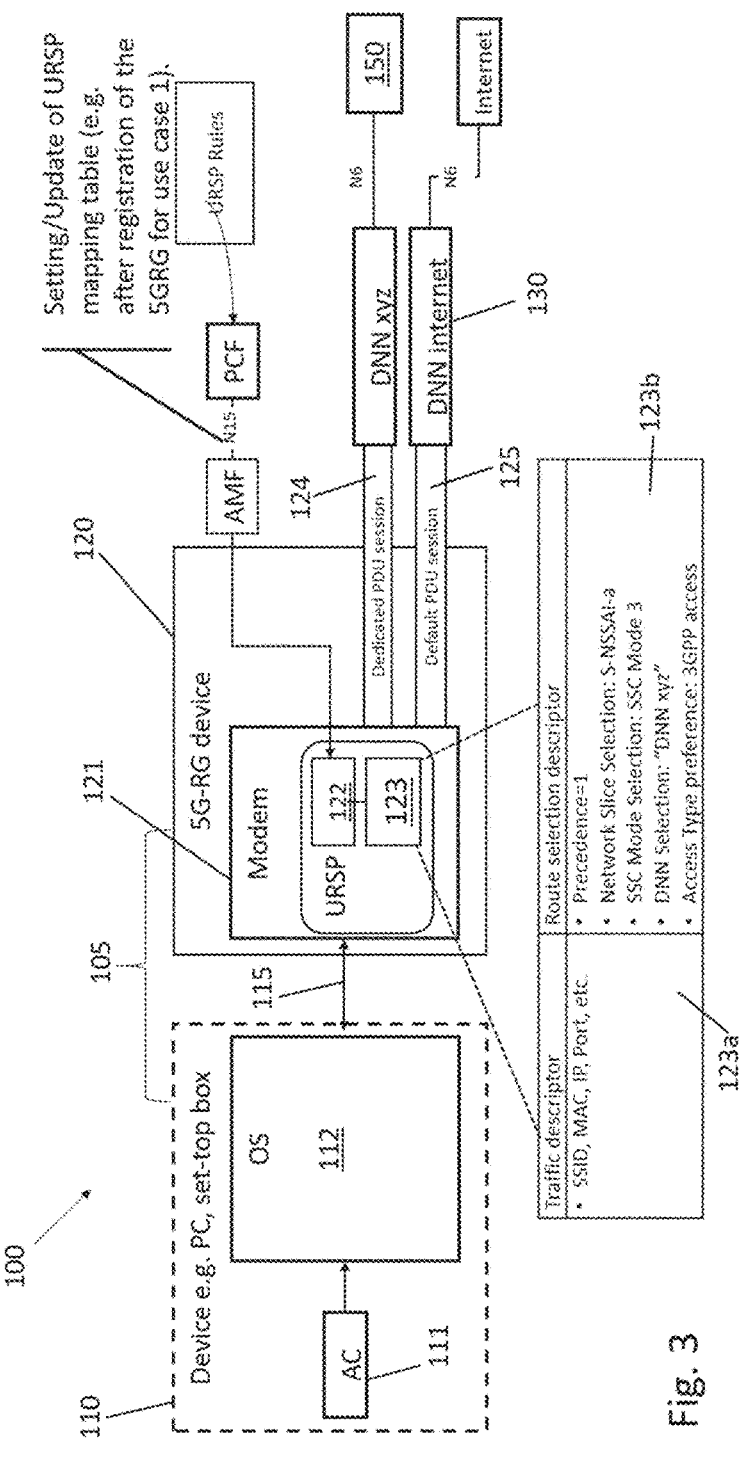
FIG. 3 schematically shows a mapping of the traffic types onto different PDU sessions.

5G-RG prototype devices only provide a default QoS class to a user equipment so that is currently not possible to tailor the PDU sessions to the actual demands of an application running on the user equipment and/or to the user equipment itself. FIG. 3 schematically shows a mapping of traffic types onto different PDU sessions. These different PDU sessions comprise dedicated QoS classes so that the communication can be tailored to the needs of the user equipment or to an application that is running on the user equipment.

In the following, three different use cases are discussed:

First use cases: static mapping of traffic descriptors onto static QoS classes or slices with manual change of traffic descriptors.

Second use case: static mapping of traffic descriptors onto static QoS classes or slices with dynamic change of traffic descriptors.

Third use case: dynamic creation of QoS classes and/or establishment triggered by an application client with dynamic change of the traffic descriptors.

FIG. 3 shows a communication system 100 comprising of a user equipment 110 and a 5G-RG 120, wherein a first communication link 115 is established between the user equipment 110 and to the 5G-RG 120.

The user equipment 110 comprises of an application client 111 that communicates with an operating system 112 of the user equipment 110.

The 5G-RG 120 comprises a modem 121 with a URSP, a handler 122 and a mapping table 123. The 5G-RG 120 also comprises communication interfaces 124, 125 for a dedicated PDU session and a default PDU session. The dedicated PDU session and the default PDU session are technically realized over the second communication link 135. The PDU sessions provide the QoS classes that means that the dedicated PDU session provides the dedicated QoS class and the default PDU session provides the default QoS class. The handler 122 can comprise a data link to a AMF and a policy control function (PCF) of the 5G core network, wherein that data link is used to set or update the URSP mapping table, for example after registration of the 5G-RG 120 for the use case 1. These PDU sessions are used to communicate with the data network, in particular a 5G core network. Finally, the user equipment 110 can communicate with an application server (AS) 150.

The 5G-RG 120 initially selects a default QoS class as the first QoS class for the UE 110. The communication comprises an identification of the UE 120 and/or a traffic descriptor that is received by the 5G-RG 120. The left column 123a of the mapping table 123 shows that in this exemplary case the traffic descriptors SSID, MAC, IP, and/or port are received. The right column 123b of the mapping table 123 shows the dedicated QoS class that is selected based on the will use of the received traffic descriptors. The right column 123b is named "route selection descriptor" and describes the properties of the dedicated QoS class. In the next step, the 5G-RG 120 applies the dedicated QoS class as the first QoS class for the communication over the first communication link 115 so that the communication is being tailored to the needs of the user equipment 110.

In the following, the different use cases will be discussed in detail:

First use case: As a pre-condition, the 5G-RG 120 pre-establishes a number of different PDU sessions 124, 125 with different pre-defined QoS classes and 5G slices via the 5G core towards a data network 130. One of these sessions is the default PDU session 125. The others are named dedicated PDU sessions 124 with well-defined QoS classes and a static mapping onto internal traffic descriptors as stored in the mapping table 123. For each user equipment 110 (e.g. MAC address) and each traffic type of a device within the home network 105, which is connected to the 5G-RG, the 5G-RG does a mapping onto the pre-established default PDU session 125. The user equipment 110 can be identified by the unique MAC address, which is transmitted to the 5G-RG 120. A traffic type is described by a traffic descriptor. For example, well-known destination IP addresses or well-known TCP ports can typically be used to identify the traffic type and/or the application client (AC) 111 by the 5G-RG 120. The user is able to manually set his own priority, either by fixed buttons on the RG 120 or via an app. He can set the priority to predefined categories (e.g. gaming, video & TV, home office and voice). The customer can choose only one at a time or order them according to the desired priority Then the 5G-RG 120 moves the selected application to the highest Qos over Wi-Fi and into the appropriate tunnel on the fixed access and across the whole network in real time. The 5G-RG gets the information from the 5G core by so-called QFI parameters. The network can identify the apps that fall in this category at the downlink and then the 5G-RG 120 can match traffic to detection and enforce priorities accordingly.

Second use case: As a pre-condition, the 5G-RG 120 pre-establishes a number of different PDU sessions 124, 125 with different pre-defined QoS classes and 5G slices via the 5G core towards a data network 130. One of these sessions is the default PDU session 125. The others are named dedicated PDU sessions 124 with well-defined QoS classes and a static mapping onto internal traffic descriptors as stored in the mapping table 123. For each user equipment 110 (e.g. MAC address) and each traffic type of a device within the home network 105, which is connected to the 5G-RG, the 5G-RG does a mapping onto the pre-established default PDU session 125. The user equipment 110 can be identified by the unique MAC address, which is transmitted to the 5G-RG 120. A traffic type is described by a traffic descriptor. A user equipment 110 can be identified by the unique MAC address, which is transmitted to the 5G-RG 120. For example, well-known destination IP addresses or well-known TCP ports can typically be used to identify the traffic type and/or the application client (AC) 111 by the 5G-RG 120. The application client (AC) 111 on the user equipment 110 periodically measures application level KPIs, e.g. application level round trip delay (ALRTD) between the AC and the serving AS or packet loss. In case these KPIs exceed some predefined threshold values, the AC 111 changes the Wi-Fi connection onto another traffic descriptor (e.g. another SSID). The 5G-RG 120 will then map the internal connection (traffic descriptor) towards the AC 111 within the home network 105 onto the corresponding pre-established dedicated PDU session (data network name (DNN), network slice selection assistance information (NS-SAI)) 1254. One option is to map the SSID and the NSSAI.

Figure 4:
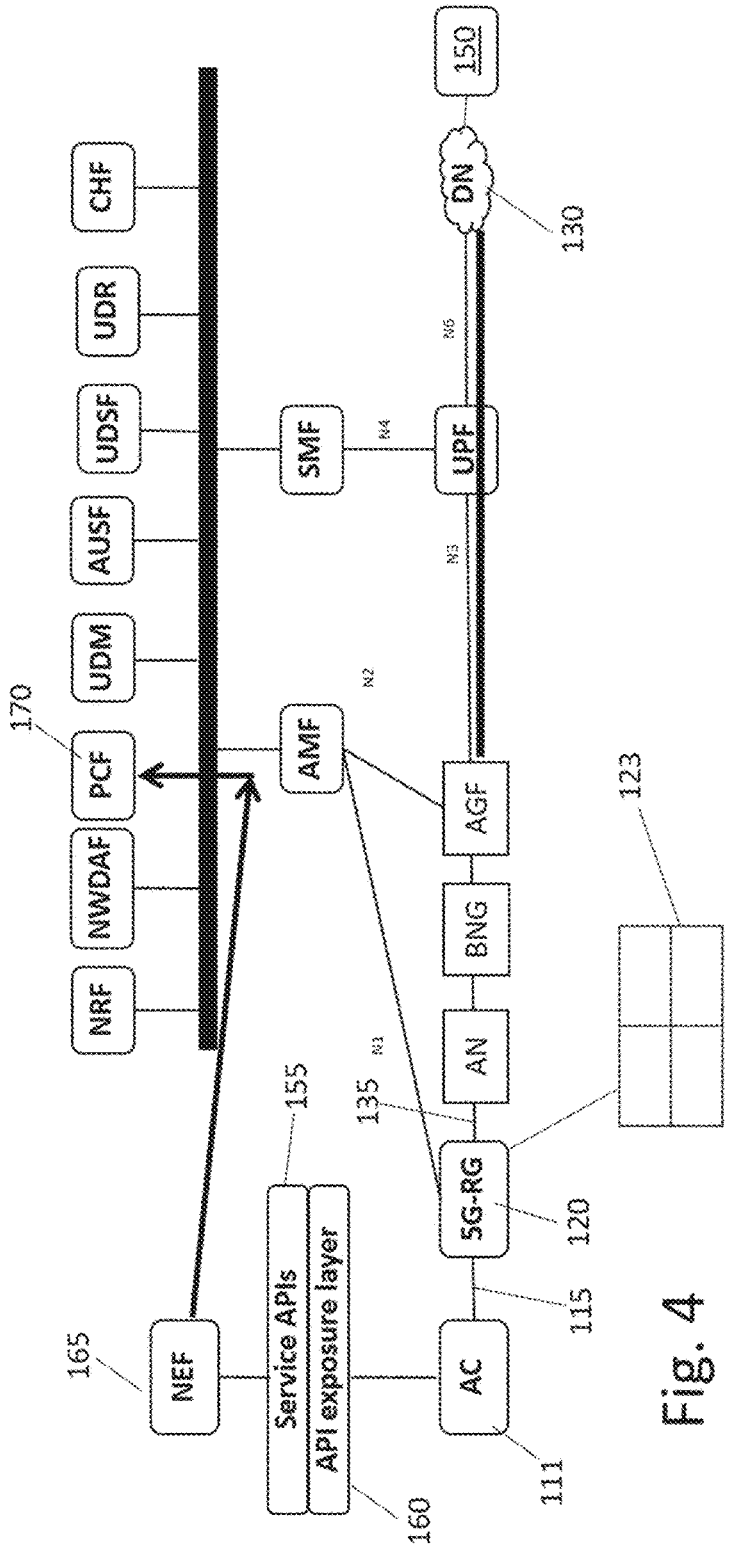
FIG. 4 shows an exemplary 5G core network architecture in communication with a 5G-RG.

Third use case: For each user equipment 110 (e.g. MAC address) and each traffic type of a device within the home network 105, which is connected to the 5G-RG, the 5G-RG does a mapping onto the pre-established default PDU session 125. The user equipment 110 can be identified by the unique MAC address, which is transmitted to the 5G-RG 120. A traffic type is described by a traffic descriptor. For example, well-known destination IP addresses or well-known TCP ports can typically be used to identify the traffic type and/or the application client (AC) 111 by the 5G-RG 120. The AC 111 on the user equipment periodically measures application level KPIs, e.g. application level round trip delay (ALRTD) between the AC 111 and the serving application server 150 or packet loss. In case these KPIs exceed some pre-defined threshold values, the AC 111 can invoke a ServiceAPI 155 over an API exposure layer 160 as shown in FIG. 4 to request a certain QoS class or slice. This triggers appropriate changes via a NEF 165 within the 5G core, e.g. within the PCF 170. The PCF 170 will then trigger a network initiated PDU session establishment towards the respective 5G-RG 120 with the requested QoS class (5QI) and/or the requested slice. This requested QoS class can dynamically be created by the 5G core. At the same time, the AC 111 changes the Wi-Fi connection to another SSID which can be mapped onto the NSSAI. The ServiceAPI 155 shall be reachable via the default PDU session towards the DN 130. The 5G-RG 120 will then map the internal connection (traffic descriptor) towards the AC within the home network onto that dedicated PDU session (DNN, NSSAI). One option is to map the SSID and the NSSAI.

All three use cases provide the advantage that dedicated QoS classes can be applied when the user equipment communicates with the data network via the home network. This enables the user, the user equipment and/or the network provider to dynamically control QoS mapping via the 5G core across available pipes (user/app→5GC NEF→URSP→5G-RG). A further advantage is that the 5G core network can be used very efficiently as the QoS classes are tailored to the technical requirements of the UE. The solution enables to dynamically change or adapt the QoS of a given data connection within the home network and towards the external data network (DN) in a consistent way.

Figure 5:
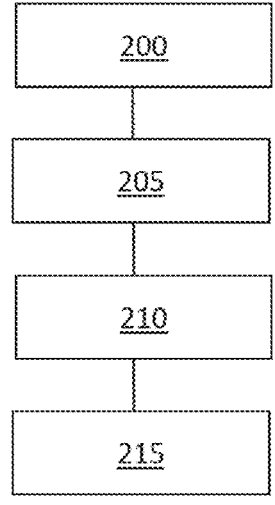
FIG. 5 shows a flowchart of a method according to an embodiment of the invention.

FIG. 5 shows a flowchart of a method according to an embodiment of the invention that can be implemented as an algorithm on a computer product.

Step 200: Initially selecting a default QoS class for the first QoS class for the UE, wherein the communication comprises an identification of the UE and/or a traffic descriptor;

Step 205: Receiving the traffic descriptor by the 5G-RG 120 and/or by a network entity within the data network;

Step 210: Selecting a dedicated QoS class based on a user input and on the received identification, or wherein the 5G-RG 120 and/or the network entity selects the dedicated Qos class based on the received identification and the received traffic descriptor by the 5G-RG 120 and/or by the network entity Step 215: Applying the dedicated QoS class as the first QoS class by the 5G-RG 120.

Figure 6:
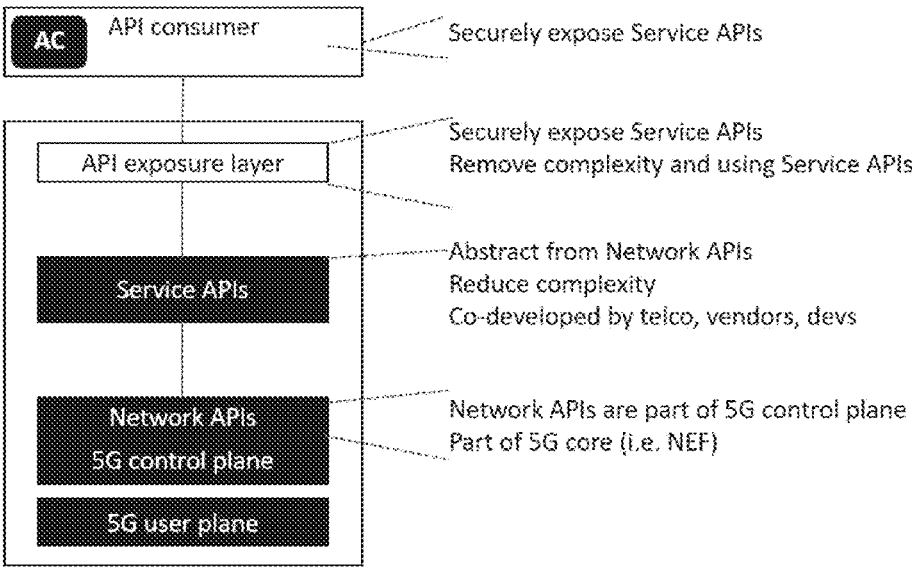
FIG. 6 shows abstract network application programming interface(s) (API(s)) into a service API.

FIG. 6 shows abstract network API(s) into a service API.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for selecting and applying a dedicated quality-of-service (QoS) class for a user equipment (UE) within a home network that communicates with a data network, wherein the UE communicates with the data network over a communication path, wherein the communication path comprises a first communication link of a first QoS class between the UE and a Residential Gateway (RG) and a second communication link of a second QoS class between the RG and the data network, the method comprising:

initially selecting, by the RG, a default QoS class for as the first QoS class for the UE;

receiving, by the RG, a communication comprising an identification of the UE and a traffic descriptor; and selecting, by the RG, a dedicated QoS class based on the received identification and the received traffic descriptor, and applying the dedicated QoS class as the first QoS class for the UE.

2. The method of claim 1, wherein the dedicated QoS class is selected based on a static table that assigns the dedicated QoS classes to a corresponding traffic descriptor.

3. The method of claim 2, wherein the table is stored within a server of the data network or within the RG.

4. The method of claim 1, wherein the traffic descriptor is designed in such a way that a minimum requirement for a QoS class can be determined from it.

5. The method of claim 1, wherein the traffic descriptor comprises one or more of the following:

Physical Port on the RG,

Wi-Fi service set identifier (SSID), media access control address (MAC), address of the UE, QoS markings in an Internet Protocol (IP) header, UE IP address, destination IP, Transmission Control Protocol (TCP), Ports, type of application, Time of day, or Uplink and/or Downlink information.

6. The method of claim 1, wherein the dedicated QoS class is selected based on a user assignment of the UE to the dedicated QoS.

7. The method of claim 6, wherein the user assignment is automatically reset after a certain time or manually reset by the user.

8. The method of claim 1, wherein the UE measures levels of key performance indicators (KPIs) and changes to other traffic descriptors based on key performance being outside one or more pre-defined key performance windows.

9. The method of claim 8, wherein the UE changes to traffic descriptors that correspond to a better QoS class based on the KPIs being worse than needed for running a current application, or the UE changes to traffic descriptors that correspond to a less good QoS class based on the KPIs being better than needed for running the current application.

10. The method of claim 1, wherein the UE measures levels of key performance indicators (KPIs), wherein a customized QoS class is created and applied as the first QoS class for the UE based on the measured KPIs exceeding pre-defined KPI threshold values, wherein the customized QoS class is set as a dedicated QoS class.

11. The method of claim 1, wherein the first QoS class and the second QoS class are identical.

12. A Communication System, comprising:

a User Equipment (UE);

a Residential Gateway (RG); and a data network;

wherein the UE is configured to communicate with the data network over a communication path, wherein the communication path comprises a first communication link of a first quality-of-service (QoS) class between the UE and the RG, and a second communication link of a second QoS class between the RG and the data network;

wherein the RG is configured to:

initially select a default QoS class as the first QoS class for the UE;

receive a communication comprising an identification of the UE and a traffic descriptor; and select a dedicated QoS class based on the received identification and the received traffic descriptor, and apply the dedicated QoS class as the first QoS class for the UE.

13. A non-transitory computer-readable medium having processor-executable instructions stored thereon, wherein the processor-executable instructions, when executed, facilitate performance of a method for selecting and applying a dedicated quality-of-service (QoS) class for a user equipment (UE) within a home network that communicates with a data network, wherein the UE communicates with the data network over a communication path, wherein the communication path comprises a first communication link of a first QoS class between the UE and a Residential Gateway (RG) and a second communication link of a second QoS class between the RG and the data network, the method comprising:

initially selecting, by the RG, a default QoS class as the first QoS class for the UE;

receiving, by the RG, a communication comprising an identification of the UE and a traffic descriptor; and selecting, by the RG, a dedicated QoS class based on the received identification and the received traffic descriptor, and applying the dedicated QoS class as the first QoS class for the UE.

* * * * *